Patented May 2, 1933

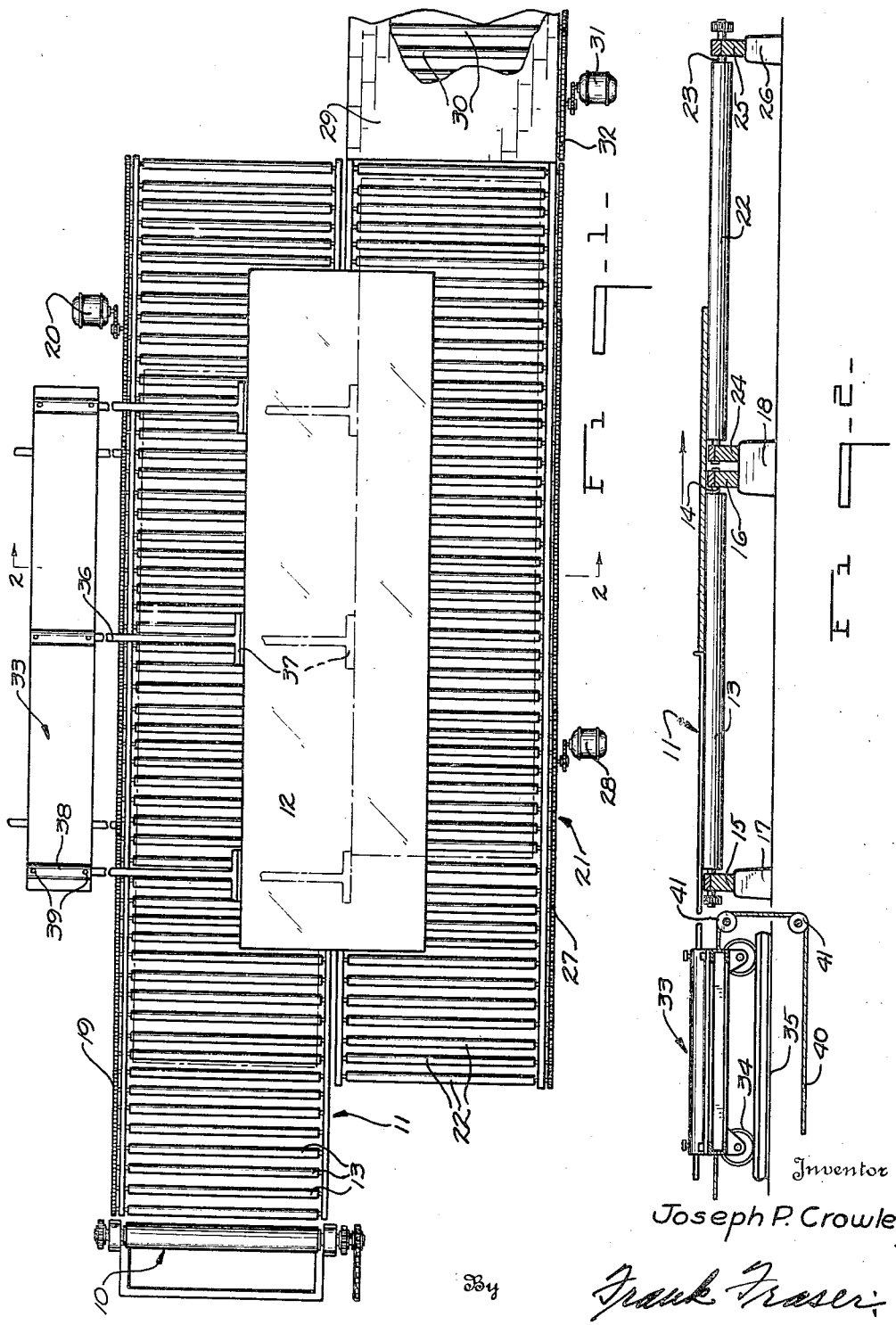

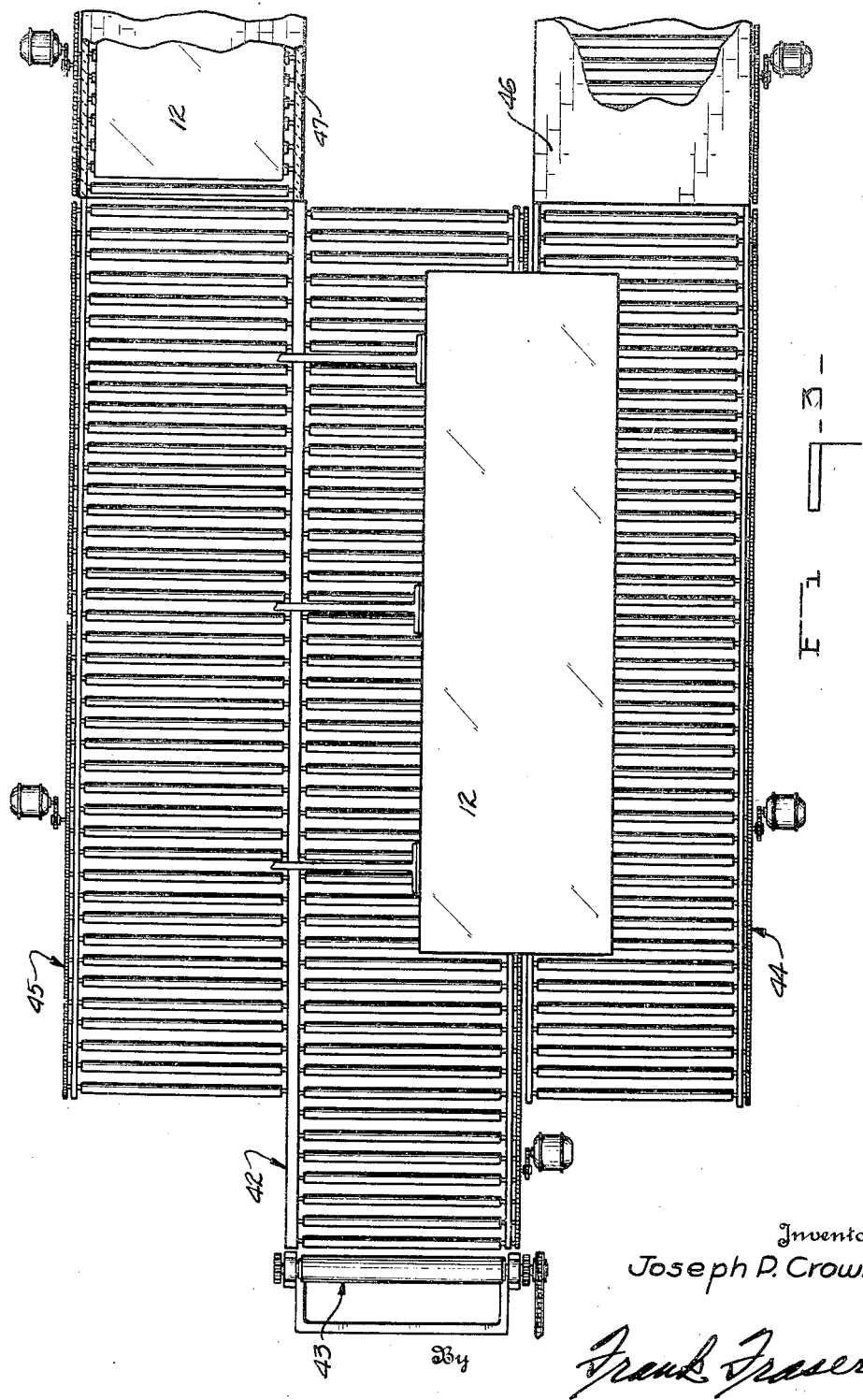

1,906,249

UNITED STATES PATENT OFFICE

JOSEPH P. CROWLEY, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed August 30, 1929. Serial No. 389,584.

This invention relates broadly to the manufacture of sheet glass and more particularly to a process and apparatus for the manufacture of glass sheets by an intermittent forming operation.

In the production of sheet glass according to one process, a plurality of successive sheets of glass are intermittently rolled at predetermined intervals from a series of charges or pours of molten glass. The molten glass is preferably melted and refined within a suitable receptacle or pot and poured therefrom onto a receiver from where it is moved to and passed between a pair of forming rolls which function to reduce the glass to a sheet of substantially predetermined and uniform thickness. In the process just described, it is desirable that the molten glass passing to the forming rolls be rapidly reduced thereby to sheet form so as not to adversely affect the quality of the glass and also in order to speed up production. While it is expedient to reduce the molten glass relatively rapidly to sheet form, it is not necessary that the glass be annealed while traveling at this same high rate of speed and in fact such is undesirable for the reason that in such event, the length of annealing leer necessary would have to be exceedingly long. For example, if the glass were rolled to sheet form at the rate of 60 feet per minute and should it require 60 minutes to anneal the sheet, it will be seen that if the sheet were passed through the leer at its speed of formation, the leer necessary would have to be 3600 feet in length. The objections incident to the construction, operation and maintenance of a leer of this length are believed to be obvious.

In its broad aspect, the present invention contemplates the provision of a process and apparatus whereby a mass of molten glass may be reduced to sheet form at a relatively high rate of speed and the sheet substantially annealed while traveling at a relatively slower speed, to the end that there may be achieved with such process and apparatus those advantages incident to the rapid reduction of the molten glass to sheet form and likewise those advantages which result from slower annealing of the glass.

In a somewhat more limited aspect, the invention contemplates the provision of such a process and apparatus wherein the glass sheet is formed at a relatively high rate of speed and is received as it is formed upon a conveying mechanism traveling at substantially the same speed and which is adapted to carry the sheet forwardly at such speed until it has become substantially set, the sheet being then shifted transversely of its line of formation onto a second conveying mechanism arranged along one side of and traveling in the same direction as the first conveying mechanism but at a relatively slower speed so as to feed the sheet into an annealing leer through which it is carried at such slow speed.

Other objects and advantages of the invention will become more apparent during the course of the following description when taken in connection with the accompanying drawings.

In the drawings forming a part of this application and wherein like numerals are employed to designate like parts throughout the same, Fig. 1 is a top plan view of apparatus provided by the present invention, partially broken away, Fig. 2 is a transverse section taken substantially on line 2—2 of Fig. 1, and Fig. 3 is a top plan view of an alternate arrangement.

Referring first to Figs. 1 and 2, the numeral 10 designates in its entirety a rolling machine which may be of any preferred or conventional construction. The particular construction of the rolling machine per se forms in itself no part of the present invention and therefore need not be either shown or described in detail. However, it may be of the so-called Bicheroux type wherein a mass of molten glass is deposited upon a receiver or support and then moved therefrom between a pair of spaced forming rolls which serve to reduce the molten glass to a sheet of substantially predetermined and uniform thickness. In accordance with the present invention, there is provided a conveying table 11 positioned to receive the glass sheet 12 as it issues from the rolling machine 10. The conveying table 11 is composed of a plurality of horizontally aligned rolls 13 carried upon shafts 14 which are rotatably supported at their opposite ends in side members 15 and 16 mounted upon supports 17 and 18. All of the rolls 13 are adapted to be driven simultaneously at the same speed and the driving of the rolls may be accomplished by keying to the shaft 14 of each roll a suitable sprocket (not shown) and training about all of these sprockets a chain 19 driven from a motor 20.

Arranged parallel with and at one side of the conveying table 11 is a second conveying table 21 also composed of a plurality of rolls 22 carried by shafts 23 rotatably supported at their opposite ends in side members 24 and 25 carried by the supports 18 and 26 respectively. These rolls are also adapted to be rotated in unison and may be driven by means of a chain 27 associated with the roll shafts 23 and operated from a motor 28. Positioned at the end of the conveying table 21 is an annealing leer 29 within which are arranged a plurality of leer rolls 30 in horizontal alignment with rolls 22 and driven in unison from a motor 31 through the chain drive 32.

In carrying the invention into practice, the glass sheet designated 12 is adapted to be rolled at a relatively high rate of speed and received as it is formed upon the rolls 13 of conveying table 11 which are likewise being driven at substantially the same speed to carry the sheet forwardly. The sheet is moved forwardly at this relatively high rate of speed until it has become substantially set to permit of its being pushed from the conveyor 11 at which time the said sheet is shifted transversely onto the rolls 22 of conveyor 21. The rolls 22 are preferably continuously driven at a relatively slower speed and serve to transfer the sheet into the annealing lear 29 at the annealing speed which is relatively less than the speed of formation of the sheet. Thus, the sheet is formed at one speed and annealed while traveling at a relatively slower speed. The shifting of the sheet from conveyor 11 to conveyor 21 is affected while the sheet is maintained in constant endwise motion or, in other words, the forward movement of the sheet is not stopped during such transfer. In this manner, a continuous annealing operation is had and the danger of the sheet sagging minimized.

Any desired means may be employed for pushing the sheet from conveyor 11 onto conveyor 21 and simply for the purposes of illustration, there has been shown a pushing apparatus including a carriage 33 mounted upon wheels 34 which roll along rails 35. The carriage supports a plurality of horizontal pusher arms 36 provided with enlarged heads 37 which engage the edge of the sheet to shift the same from one conveyor onto the other. The pusher arms 36 may be adjustably secured within sleeves 38 by means of set screws or the like 39. The carriage 33 is adapted to be moved along the rails 35 by means of a cable 40 trained about a plurality of pulleys 41.

Ordinarily, it is preferred that the rolls of conveyor 11 be driven at a constant relatively high speed equal to the speed of formation of the sheet while the rolls of conveyor 21 be driven at a relatively slower yet constant speed so that the speed of travel of the different rolls are not changed during the shifting of the sheet from one conveyor to the other. However, if desired, during the shifting of the sheet from conveyor 11 to conveyor 21, the speed of the rolls 13 of conveyor 11 may be reduced to more nearly the speed of the rolls 22 of conveyor 21, or conversely, the rolls of conveyor 21 can be speeded up to more nearly the speed of the rolls of conveyor 11 during the transfer of the sheet and then slowed down to feed the sheet into the annealing leer at annealing speed, the rolls of the leer traveling at a constant annealing speed which is relatively slower than the speed of formation of the sheet.

In Fig. 3 has been illustrated a modified arrangement of the present invention wherein there is provided a conveying table 42 adapted to receive the glass sheet 12 as it issues from the rolling machine 43, the conveying table 42 being of substantially the same construction and operable in the same manner as conveying table 11 above described. Positioned at opposite sides of the conveying table 42 are the conveying tables 44 and 45, said tables being constructed and operable in substantially the same manner as conveying table 21, and having associated therewith leers 46 and 47 respectively. With this arrangement, alternate sheets formed may be shifted transversely from conveyor 42 in opposite directions onto the conveyors 44 and 45. In other words, the first sheet rolled and received upon conveyor 42 can be shifted transversely onto conveyor 44 and passed through leer 46, while the next sheet can be shifted in the opposite direction onto conveyor 45 and passed through leer 47.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, means for forming the sheet, a conveyor for receiving the sheet from the forming means and including a plurality of horizontally arranged rotatable rolls for advancing the sheet forwardly, a second conveyor positioned along one side of the first conveyor closely adjacent thereto and extending parallel therewith and adapted to receive the sheet directly therefrom, said second conveyor also consisting of a plurality of horizontally arranged rotatable rolls operating to advance the sheet in the same direction as the first mentioned conveyor, and an annealing leer positioned in line with the second conveyor for receiving the sheet therefrom and having a plurality of conveying rolls positioned in horizontal alignment with the rolls of said second conveyor.

2. In sheet glass apparatus, means for forming the sheet, a conveyor for receiving the sheet from the forming means and composed of a plurality of horizontally arranged rolls driven at a constant relatively high speed substantially equal to the speed of formation of the sheet to advance said sheet forwardly, a second conveyor positioned along one side of the first conveyor closely adjacent thereto and extending parallel therewith, said second conveyor being also composed of a plurality of horizontally arranged rolls continuously operating at a speed relatively less than the speed of the first conveyor to advance the said sheet forwardly, means for shifting the sheet transversely from the first conveyor directly onto the second conveyor, and an annealing leer including a plurality of rolls for receiving the sheet from the second conveyor, the leer rolls operating continuously at substantially the same speed as the rolls of said second conveyor.

3. The process of producing sheet glass, which consists in forming successive sheets of glass, carrying the sheets forwardly, shifting alternate sheets transversely in opposite directions while maintaining them in constant endwise motion, carrying the sheets forwardly subsequent to shifting at a speed relatively less than their speed of formation, and in annealing the sheets.

4. The process of producing sheet glass, which consists in forming successive sheets of glass, carrying the sheets forwardly, shifting alternate sheets transversely in opposite directions while maintaining them in constant endwise motion, and in continuing the forward movement of the sheets and annealing the same.

5. In sheet glass apparatus, means for forming the sheet, a conveyor for receiving the sheet from the forming means including a plurality of horizontally arranged rolls, means for driving the rolls at a constant relatively high speed substantially equal to the speed of formation of the sheet to advance the said sheet forwardly, a second conveyor positioned along one side of the first conveyor closely adjacent thereto and being also composed of a plurality of horizontally arranged rolls, means for driving said rolls at a constant speed relatively less than the speed of the first mentioned rolls to advance the sheet in the same direction as the first mentioned conveyor, means for shifting the sheet transversely from the first conveyor directly onto the second conveyor, an annealing leer including a plurality of rolls for receiving the sheet from the second conveyor, and means for driving the leer rolls at a constant speed substantially equal to the speed of the rolls of said second conveyor.

6. In sheet glass apparatus, means for forming the sheet, a conveyor for receiving the sheet from the forming means including a plurality of horizontally arranged rolls, means for driving said rolls at a constant relatively high speed substantially equal to the speed of formation of the sheet to advance the said sheet forwardly, conveyors positioned along opposite sides of the first conveyor closely adjacent thereto and extending parallel therewith, each of said last mentioned conveyors being also composed of a plurality of horizontally arranged rolls, means for driving the rolls of the last mentioned conveyors at a constant speed relatively less than the speed of the first conveyor to advance the sheet in the same direction as said first mentioned conveyor, means for shifting the sheets transversely from the first conveyor directly onto said last mentioned conveyors, an annealing leer positioned in alignment with each of said last mentioned conveyors including a plurality of rolls for receiving the sheet from the respective conveyor, and means for driving the leer rolls at a constant speed substantially equal to the speed of the rolls of said respective conveyor.

7. In sheet glass apparatus, means for forming the sheet, a conveyor for receiving the sheet from the forming means including a plurality of horizontally arranged fixed rotatable rolls, a second conveyor positioned along one side of the first conveyor and extending parallel therewith and adapted to receive the sheet therefrom, said second conveyor also consisting of a plurality of horizontally arranged fixed rotatable rolls, means for shifting the sheet transversely from the first conveyor onto the second conveyor without changing its vertical position, and an annealing leer positioned in line with the second conveyor for receiving the sheet therefrom.

8. In sheet glass apparatus, means for forming the sheet, a conveyor for receiving the sheet from the forming means including a plurality of horizontally arranged fixed rotatable rolls, a second conveyor positioned along one side of the first conveyor and extending parallel therewith and adapted to receive the sheet therefrom, said second conveyor also consisting of a plurality of horizontally arranged fixed rotatable rolls, means engaging one edge of the sheet for shifting the same transversely from the first conveyor onto the second conveyor while maintaining it in the same horizontal plane, and an annealing leer positioned in line with the second conveyor for receiving the sheet therefrom.

9. The process of forming and annealing sheet glass, which consists in first rolling a mass of molten glass to sheet form at a relatively high rate of speed, carrying the sheet forwardly as it is formed upon a series of rolls operating to advance the sheet at a speed substantially equal to its speed of formation, sliding the sheet laterally onto a second series of rolls operating to advance the sheet forwardly at a relatively slower speed, in continuing the forward movement of the sheet during the lateral sliding movement thereof from the first series of rolls onto the second series of rolls, in maintaining supporting contact between the first series of rolls and the sheet until said sheet is supported entirely upon said second series of rolls, and in then passing the sheet from the second series of rolls into and through an annealing zone.

Signed at Toledo, in the county of Lucas and State of Ohio, this 16th day of August 1929.

JOSEPH P. CROWLEY.